US008148989B2

(12) United States Patent
Kopp (10) Patent No.: US 8,148,989 B2
(45) Date of Patent: Apr. 3, 2012

(54) FERROMAGNETIC DETECTION ENHANCER COMPATIBLE WITH MAGNETIC RESONANCE

(76) Inventor: Keith Kopp, Jensen Beach, FL (US)

(*) Notice: Subject to any disclaimer, the term of this patent is extended or adjusted under 35 U.S.C. 154(b) by 523 days.

(21) Appl. No.: 12/360,367

(22) Filed: Jan. 27, 2009

(65) Prior Publication Data

US 2009/0167307 A1   Jul. 2, 2009

Related U.S. Application Data

(63) Continuation-in-part of application No. 10/095,543, filed on Mar. 11, 2002, now Pat. No. 7,489,128.

(51) Int. Cl.
*G01V 3/00* (2006.01)
(52) U.S. Cl. ............... 324/321; 321/318; 321/322
(58) Field of Classification Search .......... 324/300–322; 600/407–435; 382/128–131; 372/10, 55; 455/450
See application file for complete search history.

(56) References Cited

U.S. PATENT DOCUMENTS

| 3,443,207 | A | * | 5/1969 | Feild .................... 324/301 |
| 3,573,817 | A | | 4/1971 | Akers |
| 3,665,449 | A | | 5/1972 | Elder et al. |
| 3,725,888 | A | | 4/1973 | Solomon |
| 3,971,983 | A | | 7/1976 | Jaquet |
| 4,326,198 | A | | 4/1982 | Novikoff |
| 4,413,254 | A | | 11/1983 | Pinneo et al. |
| 4,595,915 | A | | 6/1986 | Close |
| 4,779,048 | A | | 10/1988 | Aichele |
| 4,888,579 | A | | 12/1989 | ReMine et al. |
| 5,726,628 | A | | 3/1998 | Yoo |
| 5,790,685 | A | | 8/1998 | Sallee |
| 6,133,829 | A | | 10/2000 | Johnstone et al. |
| 6,150,810 | A | | 11/2000 | Roybal |
| 6,307,473 | B1 | | 10/2001 | Zampini et al. |
| 6,308,644 | B1 | | 10/2001 | Diaz |
| 6,697,408 | B2 | * | 2/2004 | Kennedy et al. ............. 372/55 |

(Continued)

FOREIGN PATENT DOCUMENTS

EP    0353035 A2    1/1990

(Continued)

OTHER PUBLICATIONS

International Search Report for PCT/US2010/022171 dated Aug. 25, 2010.

*Primary Examiner* — Melissa Koval
*Assistant Examiner* — Tiffany Fetzner
(74) *Attorney, Agent, or Firm* — Pearne & Gordon LLP (57) ABSTRACT

An apparatus for increasing the ability to detect ferromagnetic objects by increasing the magnetization of the objects. The apparatus includes at least one coil to generate a magnetic field positioned in the area of the object to be detected. The apparatus includes an electrical energy storage capacitor bank capable of quickly releasing stored energy. The apparatus includes a high speed, high current electronic switch capable of quickly transferring the stored energy from the capacitor bank to the coil thereby producing in the coil a short duration, single polarity magnetic field pulse. The apparatus includes a sample and hold circuit capable of acquiring magnetic field sensor data during periods when the pulsed magnetic field is not present. The apparatus includes a microprocessor controller to control timing and sequence of the magnetic pulse generation and the sensor data sample and hold process. The apparatus may be for portal handheld or head mounted applications.

19 Claims, 11 Drawing Sheets

U.S. PATENT DOCUMENTS

| | | |
|---|---|---|
| 6,819,241 B2 | 11/2004 | Turner et al. |
| 6,826,204 B2 * | 11/2004 | Kennedy et al. ............... 372/10 |
| 7,058,093 B2 * | 6/2006 | Kennedy et al. ............... 372/10 |
| 7,113,092 B2 | 9/2006 | Keene |
| 7,489,128 B2 * | 2/2009 | Kopp ............................ 324/227 |
| 7,649,353 B2 * | 1/2010 | Feiweier et al. ............. 324/309 |
| 2002/0167974 A1 * | 11/2002 | Kennedy et al. ............... 372/10 |
| 2003/0156615 A1 * | 8/2003 | Kennedy et al. ............... 372/55 |
| 2003/0171609 A1 | 9/2003 | Ionkin |
| 2003/0171669 A1 * | 9/2003 | Kopp ............................ 600/410 |
| 2004/0146075 A1 * | 7/2004 | Kennedy et al. ............... 372/10 |
| 2004/0147833 A1 | 7/2004 | Czipott et al. |
| 2004/0169509 A1 | 9/2004 | Czipott et al. |
| 2004/0189293 A1 | 9/2004 | Czipott et al. |
| 2004/0217861 A1 | 11/2004 | Castle |
| 2005/0069007 A1 * | 3/2005 | Kennedy et al. ............... 372/55 |
| 2006/0158331 A1 | 7/2006 | Massengill et al. |
| 2007/0087756 A1 * | 4/2007 | Hoffberg ...................... 455/450 |
| 2009/0167307 A1 * | 7/2009 | Kopp ............................ 324/322 |
| 2009/0309594 A1 * | 12/2009 | Feiweier et al. ............. 324/309 |

FOREIGN PATENT DOCUMENTS

| | | |
|---|---|---|
| EP | 0831339 A2 | 9/1997 |
| JP | 1223949 A | 9/1989 |
| WO | 96/36873 A1 | 11/1996 |
| WO | 03/077725 A2 | 9/2003 |

* cited by examiner

FIG. 11

FERROMAGNETIC DETECTION ENHANCER COMPATIBLE WITH MAGNETIC RESONANCE

CROSS-REFERENCE TO RELATED APPLICATION

This application is a Continuation-In-Part of U.S. utility patent application Ser. No. 10/095,543 filed Mar. 11, 2002, from which benefit of priority is hereby claimed.

BACKGROUND OF THE INVENTION

1. Field of the Invention

The present invention is in the field of devices or apparatus for detecting ferromagnetic objects in or on personnel in the vicinity of an operating magnetic resonance imaging (MRI) device.

2. Background Art

The MRI has become an invaluable tool for imaging and exploring the internal anatomy without surgery. MRI has the ability to distinguish healthy from diseased tissue, fat and muscle and adjacent structures within the body which other modalities cannot differentiate. MRI uses safe radio waves and a strong magnetic field to generate the information, which is processed by a computer, to create an image. There are now about 10,000 MRI machines currently in use in the United States.

Because of the desire for higher quality and higher resolution, the static magnetic field strength has increased steadily over the last 25 years, from a fraction of a Tesla to the current situation where 3 Tesla magnets are common. Most new magnets for MRI are superconducting and as a result very expensive to start up, causing the requirement for the magnet to be kept always on. In an emergency, these superconducting MRI magnets cannot be turned off quickly.

In an effort to allow MRI magnets with larger magnetic fields to be sited in rooms of modest dimensions, many modern MRI machines incorporate active magnetic shielding. The maximum magnetic field outside the magnet room is generally limited to 5 gauss. In order to meet this requirement, yet minimize the room size for the larger static magnetic fields of modern MRIs, these modern MRIs, use active shielding. Active shielding causes the spatial gradient (dB/dz) to increase, where B is the magnetic field strength and z is the distance from the isocenter of the MRI magnet.

The large magnetic field of the MRI magnet will attract ferromagnetic objects in the MRI magnet's field of influence. This force of attraction can cause ferromagnetic objects to approach the MRI magnet at high velocity. The force of attraction is related to the product of the spatial gradient (dB/dz) and the magnetic field strength B. Modern MRI machines, which have large magnetic fields and steep spatial gradients, can impart a strong force on relatively modest sized objects. It is known, for example, that a hairpin can reach speeds of 40 MPH when released near a typical 1.5 Tesla MRI.

The risk and consequent injuries from a projectile attracted are well known. In 2001, for example, a 6 year old boy was killed when a ferromagnetic oxygen cylinder was pulled into the magnet while being imaged. But even small objects can be dangerous. For example, an MRI patient needed to have a bobby pin surgically removed from the nasal cavity when the pin was drawn towards the center of the bore while the patient was laying head-in in the MRI. Another MRI patient forgot a fingernail clipper was in his pocket. While in the MRI magnet, he tried to remove it. The fingernail clipper slipped from his hands, and flew into his eye causing blindness. There are also life threatening risks to patients and other personnel who have implanted devices such as pacemakers, implanted defibrillators, or intracranial aneurysm clips.

Detecting small ferromagnetic objects in a passive ferromagnetic detection system is difficult since, among other factors, the disturbance to the local magnetic field is a function of the ferromagnetic mass. The detectability of a ferromagnetic object is also a function of the object's past history of exposure to magnetic fields. In the typical terrestrial environment, objects are subjected to the earth's magnetic field of approximately 0.5 Gauss.

Figure 1:
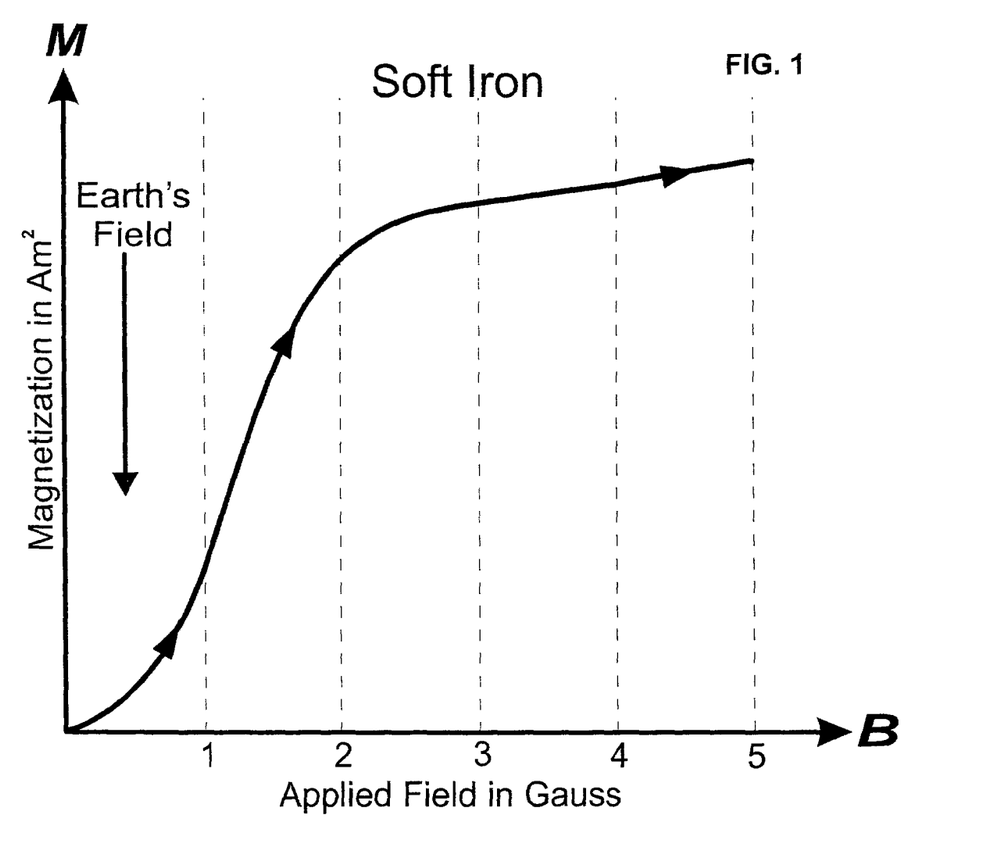
FIG. 1 is a graph of the initial magnetization of soft iron

Passive ferromagnetic detectors, meaning detectors that rely solely on the ambient magnetic field, look for distortion signatures related to the passage of magnetized objects. In addition to other factors, the degree of magnetization (M) of the object directly affects the detectability of ferromagnetic objects. The higher the level of magnetization of the object, the more easily the object is detected all other factors being equal. FIG. 1 indicates that ferromagnetic material, such as relatively pure soft iron, develops a significant degree of magnetization in the presence of modest magnetic fields such as the earth's magnetic field.

Figure 2:
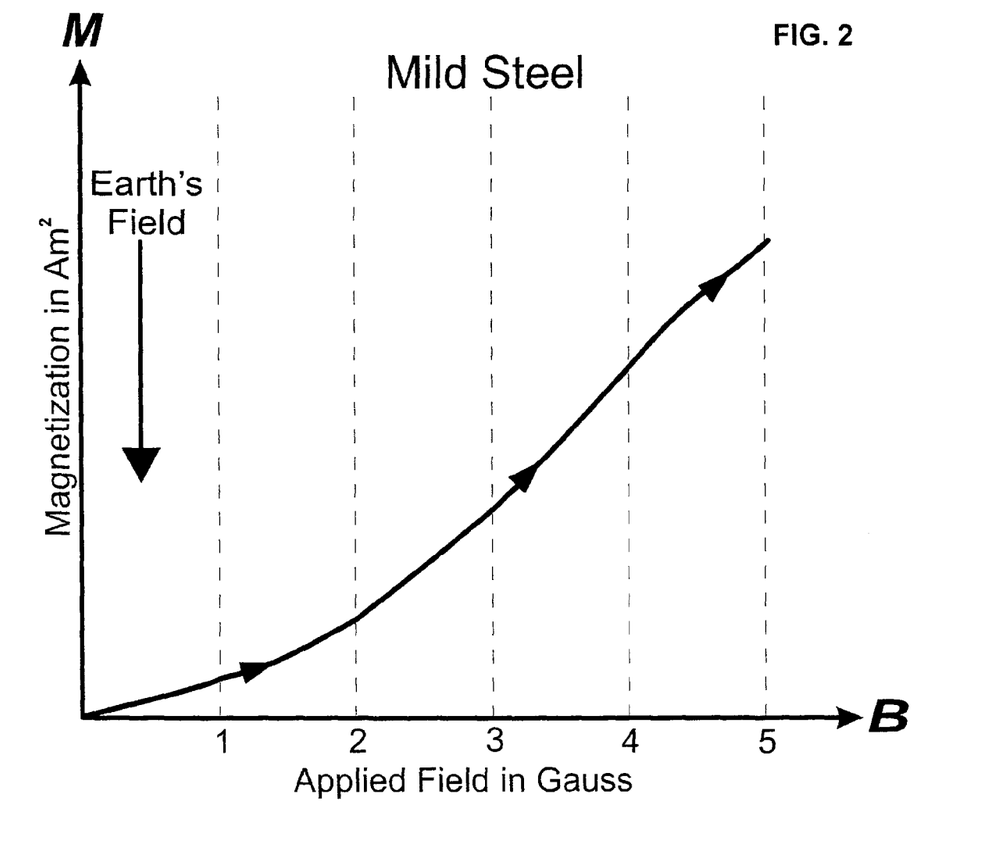
FIG. 2 is a graph of the initial magnetization of mild steel

A significant degree of magnetization of a ferromagnetic object with an ambient magnetic environment provided by the 0.5 Gauss of the earth may not be produced in medium hard magnetic material such as mild steel. FIG. 2 indicates that an applied field of greater than 0.5 Gauss is required to ensure an appreciable magnetization in mild steel. If the recent magnetic history of the medium hard ferromagnetic object has only been the earth's magnetic field, the object will be more difficult to detect with a passive ferromagnetic detector.

Figure 3:
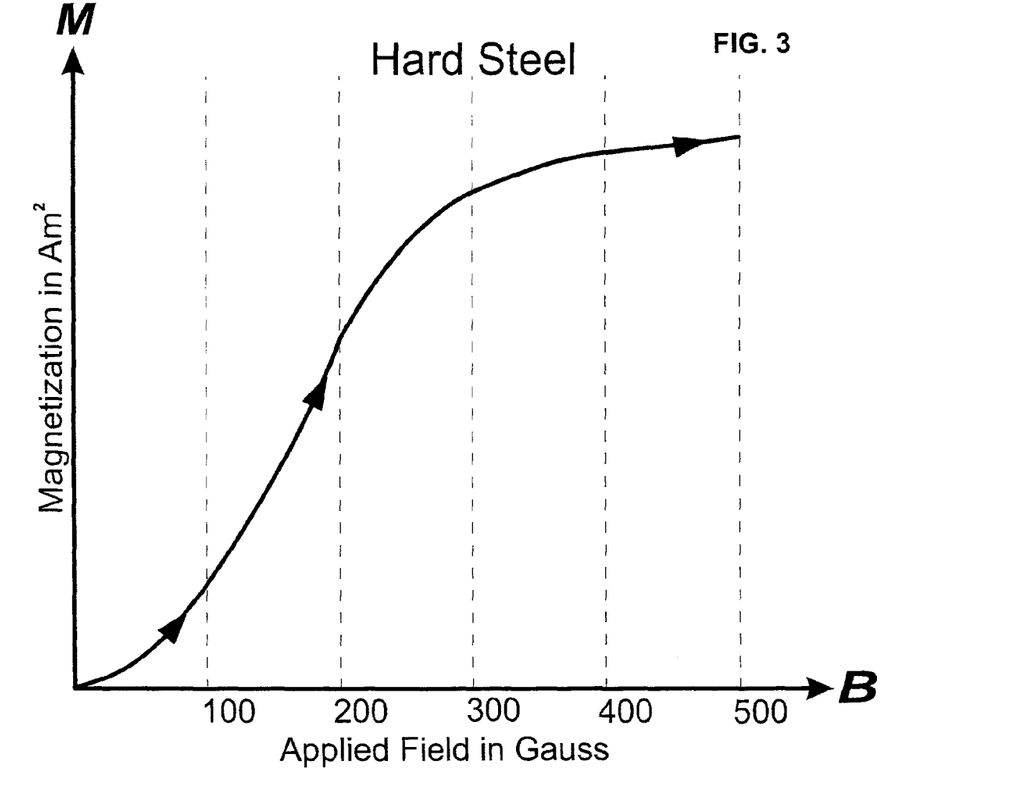
FIG. 3 is a graph of the initial magnetization of hard steel

There are ferromagnetic objects that are even more difficult to magnetize. These harder ferromagnetic objects, such as a bobby pin used in women's hair, may not be sufficiently magnetized even in the 1 to 5 Gauss field typically present near the entrance to the room which contains the MRI magnets. The magnetization curve for a bobby pin is shown in FIG. 3.

A possible solution may be had with an active magnetic detector device of the portal or wand configuration, meaning a detection device which contains permanent magnet or coils to generate a magnetic field. A field may be generated which is strong enough to magnetize even hard ferromagnetic objects. However the use of large magnetic fields is dangerous for personnel. For example, if a person has an intracranial aneurysm clip, a large applied magnetic field may twist the clip potentially resulting in a brain hemorrhage. Cardiac pacemakers may cease to generate timing signals or be reprogrammed in a large magnetic field. Because of these risks as well as many others, the Food and Drug Administration and the International Commission on Non-Ionizing Radiation Protection and others have defined 5 Gauss as the maximum magnetic field exposure safe for the general public. As previously noted, a 5 Gauss applied magnetic field is not sufficient to magnetize medium hard or hard magnetic material.

DESCRIPTION OF PRIOR ART

U.S. Pat. No. 4,990,850, inventor Votruba discloses an apparatus and methods for detecting ferromagnetic materials. As disclosed, the presence of a ferromagnetic object is detected by use of a primary magnetic field from a large permanent magnet. Two Hall effect sensors with flux concentrators are used to effect detection. The Hall detectors are arranged adjacent to one another and positioned so that they detect nearly the same field. To prevent the Hall sensors from being overloaded, both sensors are oriented perpendicular to the primary applied field.

Although some increased sensitivity is achieved by the use of a primary magnetic field, because of the previously mentioned 5 Gauss safety limit, harder ferromagnetic objects will still not be magnetized and as a result this class of objects will still be hard to detect. Further, because of the constraints on sensor pair location and orientation and magnetic field uniformity, this apparatus does not lend itself for use in a portal or hand-held wand.

U.S. Pat. No. 5,689,184, inventor Jeffers et al discloses applying a field by means of 2 coils to enhance detection. The preferred embodiment states "The DC voltage is set to give a steady magnetic field of about 2 Oersteds, well below a magnetic field that can disturb pacemaker devices" [2-54]. As stated previously, keeping the magnetic field below 5 Gauss does not magnetize hard ferromagnetic materials. The sensor orientation must also be very specific so as to not overwhelm the sensors with the applied magnetic field. Further special circuitry must be present to remove common mode noise and thermal noise generated as part of the side effects of producing the primary magnetic field.

U.S. Pat. No. 7,315,166, inventor Czipott et al discusses using a DC magnetic field or alternatively an AC field at very low frequencies to avoid inducing eddy currents. For the previously discussed safety reasons, the field strength must still be limited to 5 Gauss DC or RMS. As a result, a significant improvement in detectability of hard ferromagnetic material is not realized. The need to orient the applied magnetic field with respect to the sensors is also discussed.

U.S. Pat. No. 7,239,223, inventor Massengill et al magnetizes ferromagnetic material through the use of a hand-held magnet. Because of safety considerations, the patent suggests using a magnet in the range of 50 to 200 Oe [8-22] "the preferred distance from the hand-held magnet to the head or other body portion is approximately 2 to 3 inches."[8-23]. Since the distance between the personnel being screened is variable and operator dependant, the applied magnetic field is variable and may present the previously discussed safety issues relating to magnetic fields over 5 Gauss. Further, the actual screening process of moving the magnet over the entire body of the person being screened is problematic as areas of the body may be inadvertently missed. The entire process of moving a magnet over the entire body is also very time consuming.

What is needed is a safe, effective, reliable way of ensuring that ferromagnetic material including magnetically hard alloys, are magnetized before being scanned by a ferromagnetic detector. This magnetization process must be performed without exceeding recognized safe magnetic field levels and without requiring special magnetic field sensor orientation and configuration.

BRIEF SUMMARY OF INVENTION

In accordance with one aspect, the present invention provides an apparatus for increasing the ability to detect ferromagnetic objects for magnetic fields produced by those objects by increasing the magnetization of the objects but while not exposing the personnel associated with these objects, passing through a portal, to unsafe levels of magnetic fields. The apparatus includes at least one coil to generate a magnetic field positioned in the area of the object to be detected. The apparatus includes an electrical energy storage capacitor bank capable of quickly releasing stored energy. The apparatus includes a high speed, high current electronic switch capable of quickly transferring the stored energy from the capacitor bank to the coil thereby producing in the coil a short duration, single polarity magnetic field pulse. The apparatus includes a sample and hold circuit capable of acquiring magnetic field sensor data during periods when the pulsed magnetic field is not present. The apparatus includes a microprocessor controller to control the timing and sequence of the magnetic pulse generation and the sensor data sample and hold process.

In accordance with another aspect, the present invention provides an apparatus for increasing the ability to detect ferromagnetic objects passing under a hand-held detector for magnetic fields produced by those objects by increasing the magnetization of the objects while not exposing the personnel associated with these objects to unsafe levels of magnetic fields. The apparatus includes at least on coil to generate a magnetic field positioned in the area of the object to be detected. The apparatus includes an electrical energy storage capacitor bank capable of quickly releasing stored energy. The apparatus includes a high speed, high current electronic switch capable of quickly transferring the stored energy from the capacitor bank to the coil thereby producing in the coil a short duration, single polarity magnetic field pulse. The apparatus includes a sample and hold circuit capable of acquiring magnetic field sensor data during periods when the pulsed magnetic field is not present. The apparatus includes a microprocessor controller to control the timing and sequence of the magnetic pulse generation and the sensor data sample and hold process.

In accordance with yet another aspect, the present invention provides a head mounted apparatus which increases the ability to detect ferromagnetic objects for magnetic fields produced by those objects by increasing the magnetization of the objects but while not exposing the personnel associated with these objects existing in the orbit of the eye, to unsafe levels of magnetic fields. The apparatus includes at least on coil to generate a magnetic field positioned in the area of the object to be detected. The apparatus includes an electrical energy storage capacitor bank capable of quickly releasing the stored energy. The apparatus includes a high speed, high current electronic switch capable of quickly transferring the stored energy from the capacitor bank to the coil thereby producing in the coil a short duration, single polarity magnetic field pulse. The apparatus includes a sample and hold circuit capable of acquiring magnetic field sensor data during periods when the pulsed magnetic field is not present. The apparatus includes a microprocessor controller to control the timing and sequence of the magnetic pulse generation and the sensor data sample and hold process.

In accordance with one feature of the present invention, a short monopolar pulsed magnetic field is provided of sufficient field strength and duration to magnetize hard ferromagnetic material but with a low enough pulse duty cycle to not exceed the 5 Gauss average field strength which is the recognized safety level for general personnel exposure. Magnetization will then be achieved safely. The magnetic pulse can be generated by discharging the energy from a capacitor bank into a coil assembly configured to provide the desired magnetic field coverage and field orientation. The pulses can be activated only when personnel are present by means of a motion or position detector. The coil assembly is placed before or in the ferromagnetic detector.

In accordance with one feature of the present invention, the sensors are sampled and the data held between magnetization pulses such that the effect of the magnetic field produced by the magnetization pulse will not be represented in the sensor output data. As a result, special sensor orientation, configuration or common mode signal compensation is not required. Since the average magnetic field energy in the coil is low, massive power supply requirements are unnecessary. Multiple coils may be provided and pulsed sequentially to provide magnetization in all 3 (x, y and z) axes.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF EXAMPLE EMBODIMENTS

In accordance with one aspect, the invention can use the fact that ferromagnetic objects that are not appreciably magnetized by the earth's magnetic field will retain a significant level of magnetism for a time after the object is magnetized. This characteristic is called retentivity. For example, a bobby pin retains about one half of its magnetization for a considerable period of time after being exposed to a 100 Gauss magnetic field. As a result, the application of a magnetic field to an object does not have to be coincident in time with the act of screening the ferromagnetic object.

Figure 11:
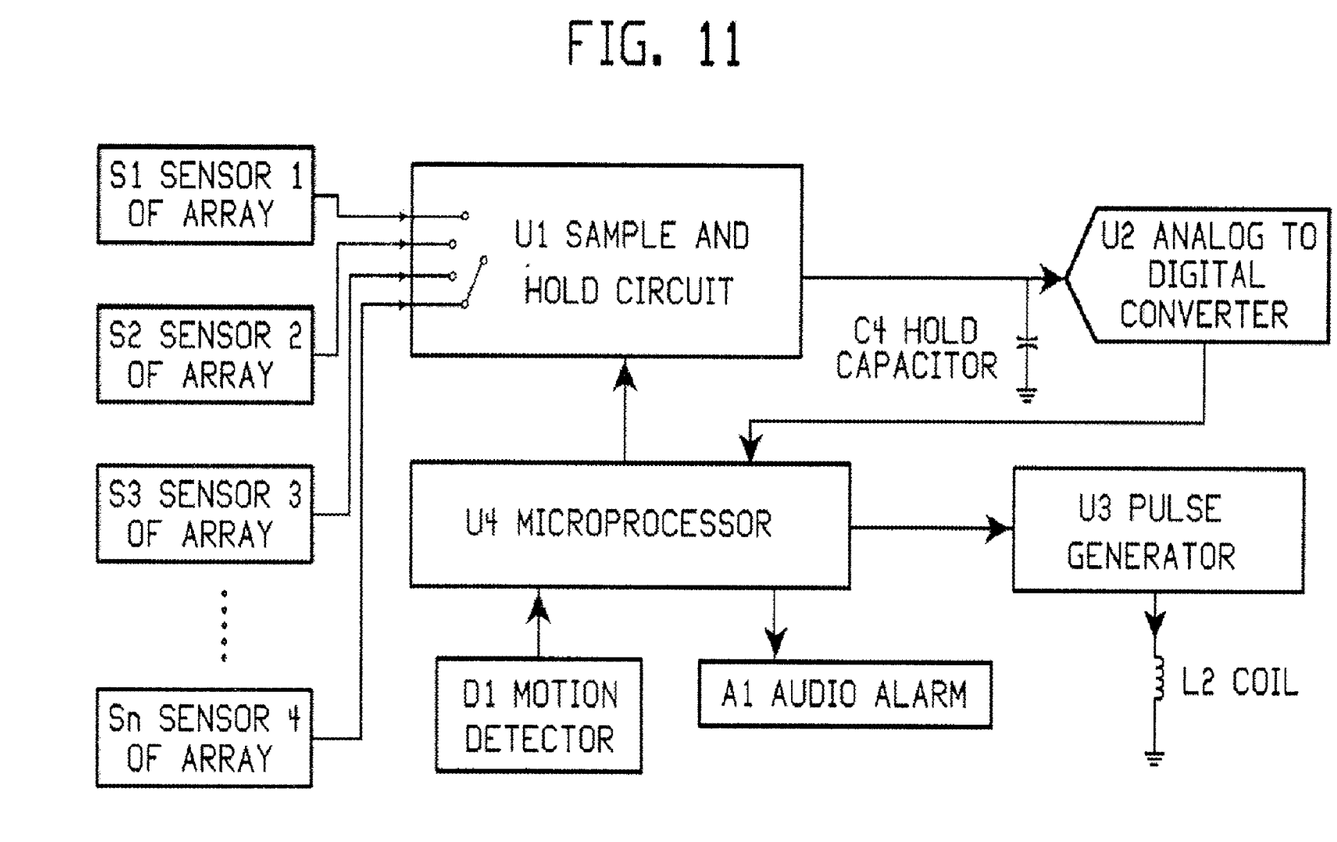
FIG. 11 is a block diagram of the electronic logic of the apparatus

FIG. 11 is a block diagram of the electronic logic of the present invention. The sequence of events in the invention is controlled by the microprocessor U4. Upon application of power to the device, the microprocessors U4 performs a system check of the sensors S1 through Sn, as well as verifying the operation of the sample and hold circuit U1, the analog to digital converter U2, the pulse generator U3, and the motion sensor D1. The microprocessor U4 then activates the indicators, alarm displays, and audio alarms A1 in sequence to verify their operation. The sensors S1 through Sn are normalized by, the microprocessor U4, to the magnetic environment.

The microprocessor U4 then enters the standby mode until the motion detector D1 senses motion of an object or person moving toward the sensor array S1 through Sn. A signal is sent from the motion detector D1 to the microprocessor U4 indicating that an object or person is approaching the sensor array. The microprocessor consequently outputs a signal to activate the magnetic pulse generator circuit U3. The magnetic pulse generator circuit U3 attempts to magnetize the approaching object or ferromagnetic material on the approaching person by discharging the energy stored capacitor bank into the coil L2. When the effects of the magnetization pulse have fully dissipated, the microprocessor U4 then outputs a signal to the sample and hold circuit U1 to sample the first sensor and hold its value in C4. The microprocessor U4 outputs a signal which causes the voltage value stored in the hold capacitor C4 to be read by the analog to digital convertor U2. The microprocessor U4 then outputs a command to transfer the digital signal value from the first sensor S1 from the analog to digital convertor U2 to the microprocessor U4.

The above sensor sample and hold process, analog to digital conversion and storage routine is repeated until the last sensor Sn is read and stored.

If the microprocessor U4 detects signals from the sensor array, S1 through Sn, which indicate the presence of ferromagnetic material, the microprocessor U4 will output signals to the appropriate visual and audio alarms for a period of time defined by the microprocessor's U4 firmware.

Upon completion of the alarm display sequence, the microprocessor U4 interrogates the motion detector D1 to determine if the object or person is still moving in the immediate vicinity of the portal. If motion is detected, the microprocessor U4 will again output a signal to the magnetic pulse generating circuit and begin the sensor data acquisition sequence described above.

If no motion is detected from the motion detector D1, the microprocessor U4 will return to the standby mode until the motion detector D1 again detects an object or person approaching the sensor array S1 through Sn.

Figure 4:
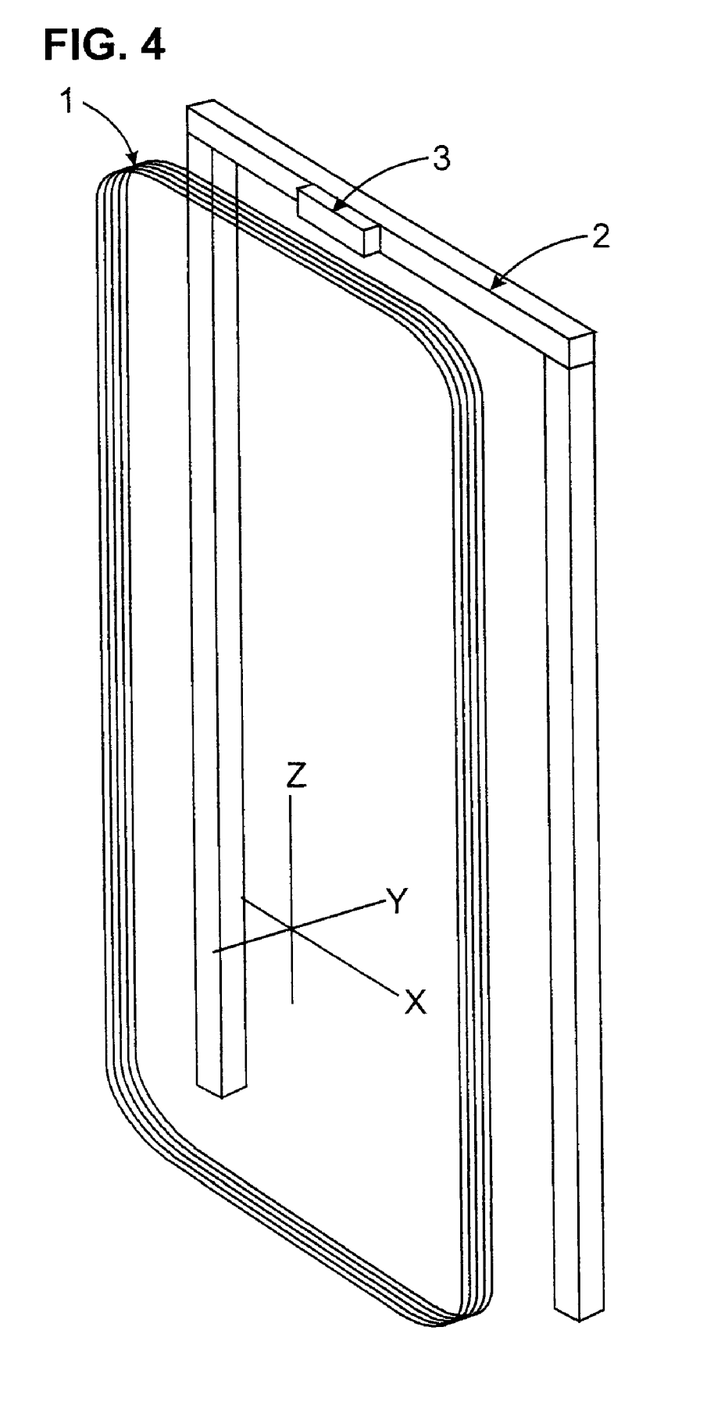
FIG. 4 is a perspective schematic view of a portal with a single magnetization coil

An example embodiment in accordance with one aspect of the present invention is shown in FIG. 4. A magnetization coil 1 can be positioned in the sensor array structure 2 or in the approach to ferromagnetic detector portal. In FIG. 4, the components are shown in an exploded view. The magnetization coil 1 is one example of a coil arrangement. The magnetization coil 1 encompasses an area of approximately the dimensions of the aperture of the ferromagnetic portal itself. A motion detector 3 is used to activate the array as well as start the magnetization sequence.

Figure 5:
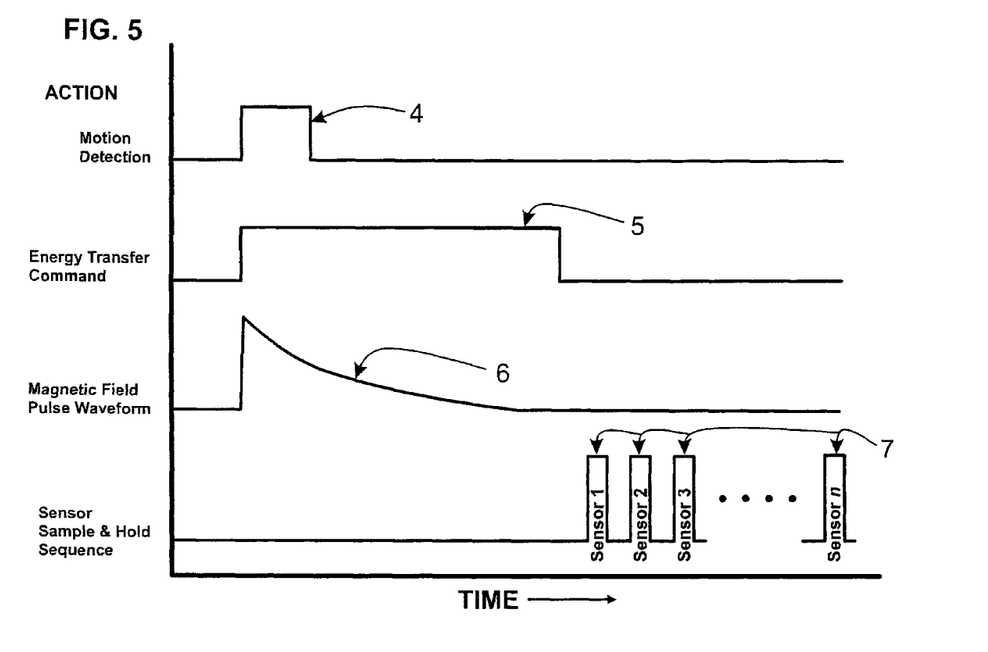
FIG. 5 is an apparatus timing diagram

It is instructive to refer to FIG. 5 which indicates the magnetization sequence of events, in order to understand the operation of this embodiment of the present invention. When a person to be screened approaches the portal, the motion detector trips and generates an input signal pulse 4 to a microprocessor. A pulse 5 is then generated by the microprocessor which closes an electronic switch for a capacitor bank causing stored energy in the capacitor bank to be dumped into the magnetization coil 1 (see FIG. 4). In response, the coil 1 generates a magnetic field pulse waveform. The shape of the generated pulse is shown as 6 (FIG. 5) and has an exponential decay characteristic. A magnetization pulse duration of 100 to 300 microseconds is sufficient to produce significant magnetization in ferromagnetic objects of interest. Equally important, pulses of this duration produce minimal to negligible translational or rotational displacement on ferromagnetic objects within the influence of the field generated by the magnetic pulse. After sufficient time to allow any residual effects caused by the magnetization pulse to dissipate, (about 20 milliseconds) a sequential magnetic sensor sampling routine represented by sequence 7 in FIG. 5 is initiated by the microprocessor, with each sample held and converted to a digital number by the analog to digital converter until all N sensors have been sampled. N is the number of sensors in the array.

Upon completion of the sequential sensor sampling and analog-to-digital conversion process, another magnetization pulse can be generated if the motion detector senses that the ferromagnetic detector should remain active. These magnetization pulses do not need to be produced very often. A person walking at very fast pace of 5 feet per second would require magnetization pulses every 200 milliseconds in order to produce a magnetization pulse for every foot of forward motion of the person.

If a magnetization pulse of 200 microseconds is produced every 200 milliseconds, the magnetization pulse train duty cycle is 0.1 percent. If then the magnetizer is configured to produce a pulse magnetic field of 300 Gauss, the average field strength will be 0.3 Gauss, well below the recognized average magnetic field level which is considered safe for the general public.

Figure 6:
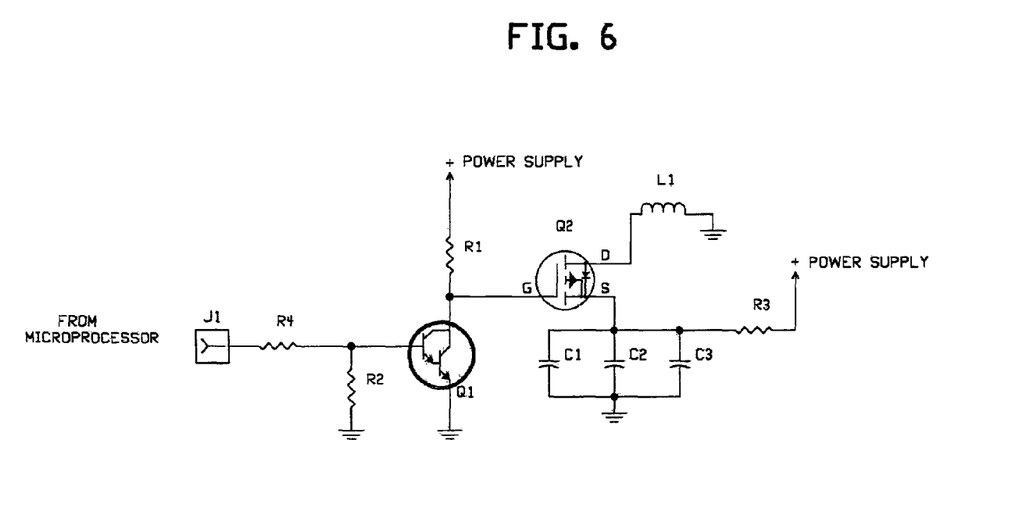
FIG. 6 is a schematic diagram of a magnetic pulse generating circuit

FIG. 6 shows an example of the magnetic pulse generating circuit. A positive pulse from the microprocessor enters J1 and turns on transistor Q1. Transistor Q1 in turn causes HEXFET Q2 to close and connect a capacitor bank C1, C2 and C3 to be connected to the coil L1. It is to be appreciated that these components merely provide one example of a high speed, high current switch arrangement. The capacitor bank C1, C2 and C3 are charged through R3 from the power supply voltage between pulses from the microprocessor. The capacitor bank C1, C2, and C3 are configured in parallel to lower the effective series resistance while increasing the total stored energy. The capacitor bank C1, C2 and C3 is one example of a capacitor arrangement. A different number of capacitor s can be used. A lower effective series resistance allows a higher current pulse to be generated which in turn will produce a larger peak magnetic field strength.

Figure 7:
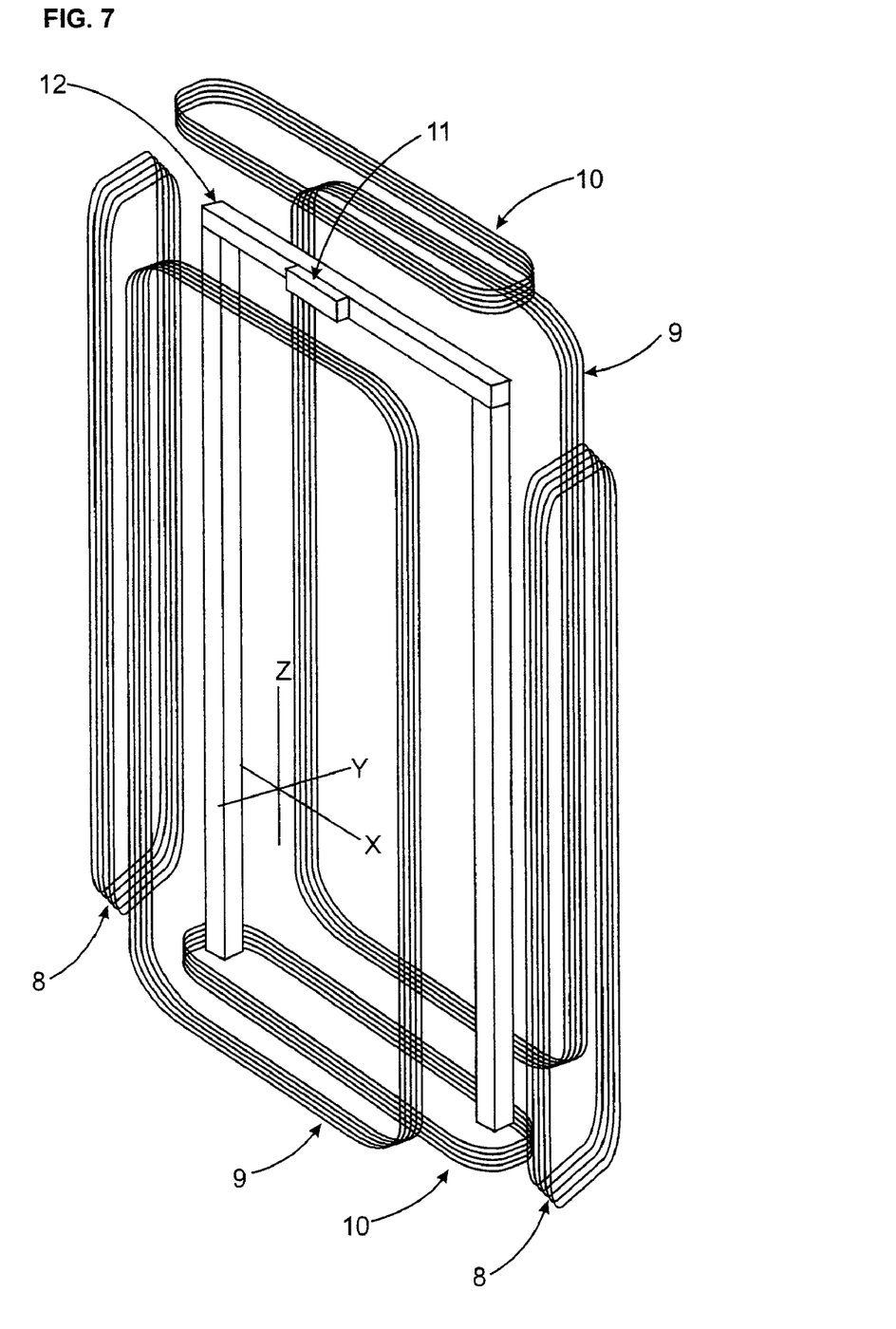
FIG. 7 is a perspective schematic view of a portal with x, y and z magnetization coils

Another example embodiment in accordance with an aspect of the present invention is shown in FIG. 7. The sensor array is contained in the vertical sections of the portal assembly 12. For the strongest magnetization of a ferromagnetic object, the magnetic field should be applied along the longest axis of the ferromagnetic object. Three coils or pair of coils, 8, 9 and 10 are oriented orthogonally in the x, y and z planes, respectively. Each coil or pair of coils has a capacitor bank and electronic switch associated with it. The coils in each pair produce fields that reinforce each other in the area between the coils. Since the shape and positional orientation of the ferromagnetic object will vary, improved magnetization will occur if the magnetic field is applied in more than one direction. If the magnetic field is applied from three orthogonal directions, the maximum difference from the magnetic field axis and the longest axis of the ferromagnetic object is 45 degrees.

Thus, the magnetism of a ferromagnetic object can be increased. Such increased magnetism allows for increased efficiency of a ferromagnetic detector as set forth in the U.S. Ser. No. 10/095,543 application.

When a person to be screened approaches the portal, a motion or position sensor 11 is activated. The sensor 11 may be located at any suitable location. The stored energy of the first capacitor bank is discharged into the x coil pair 8 by an output signal from the microprocessor for approximately 100 to 300 micro seconds. After the magnetic field pulse from the x coil pair 8 subsides, the microprocessor waits about 1 millisecond to allow the domains in the ferromagnetic material to settle. A second signal is then produced by the microprocessor which discharges the energy from a second capacitor bank into the y coil pair 9. The above process is repeated for the z coil pair 10 and capacitor bank set.

Upon completion of the generation of pulses from all coils and after sufficient time to allow any residual effects caused by the magnetization pulse to dissipate, (about 20 milliseconds) a sequential sampling routine of the magnetic field sensors is initiated by the microprocessor, with each sample held and converted to a digital number by an analog to digital converter.

Figure 8:
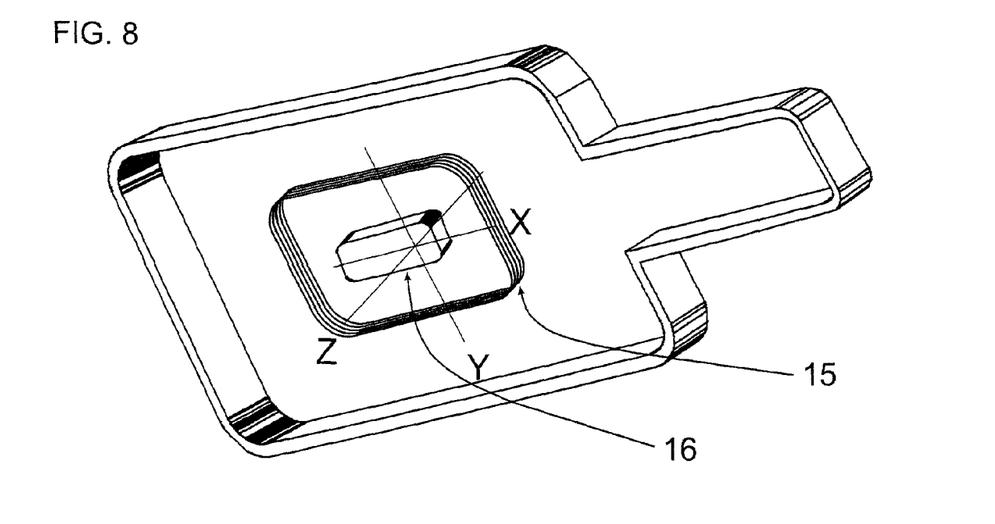
FIG. 8 is a perspective schematic view of a hand-held ferromagnetic detector with magnetization coil

Another embodiment in accordance with an aspect of the present invention involves its incorporation into a hand-held ferromagnetic detector. This embodiment is shown in FIG. 8. A coil 15 is embedded in the device parallel to the sensing surface of the sensor array 16 and surrounding the magnetic field sensor array FIG. 8A 16. Upon a command from a microprocessor, the stored energy from a capacitor bank is discharged into the coil thereby magnetizing ferromagnetic objects within the area of influence of the magnetic pulse generated by the coil 15. These pulses are repeated as needed as the hand-held detector is moved over the areas of interest. As with the portal embodiments described previously, the sensor data is sampled after sufficient time to allow any residual effects caused by the magnetization pulse to dissipate.

Figure 8A:
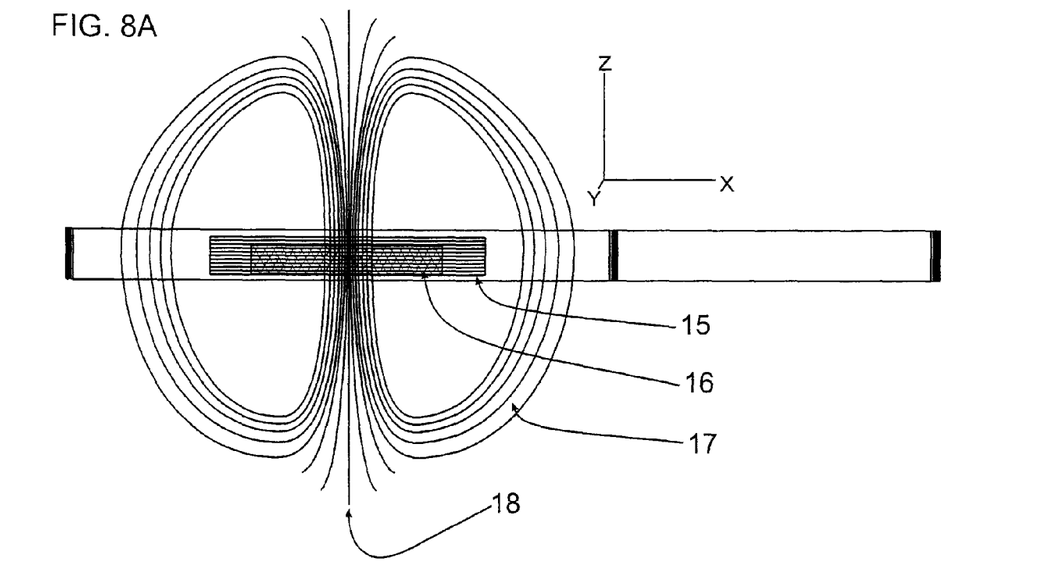
FIG. 8A is a side view of the hand-held detector of FIG. 8

In FIG. 8A the angle of the magnetic lines of force 17 vary from the center line 18 of the coil outward. This attribute of the magnetic field lines changing angle from the center line of the coil causes ferromagnetic objects to be exposed to magnetic field of varying orientation as the hand-held detector is swept across the area of interest. Since the relative alignment of the magnetic field lines 17 in relation to the physical orientation of a ferromagnetic object affects the object's magnetization, higher magnetizations is possible than with magnetic lines of force from a single direction.

Figure 9:
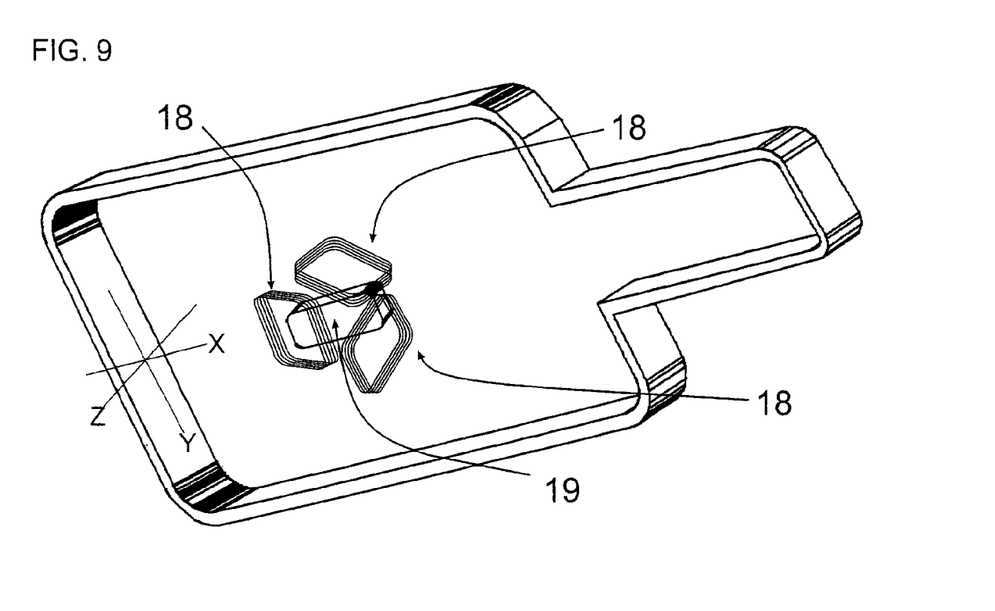
FIG. 9 is a perspective schematic view of a hand-held ferromagnetic detector with 3 magnetization coils
Figure 9A:
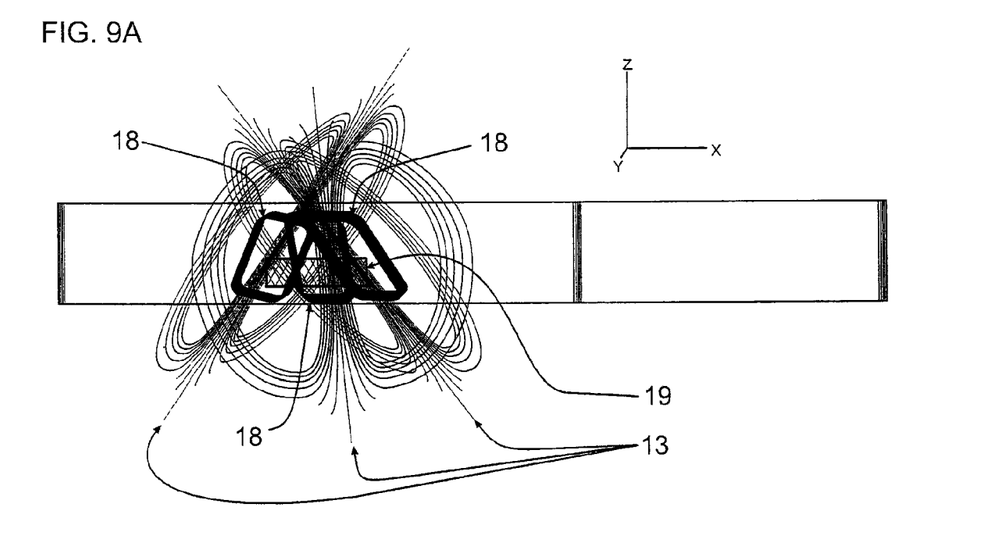
FIG. 9A is a side view of the hand-held detector of FIG. 9

The ferromagnetic object being scanned by a hand-held detector can be exposed to an even greater range of angles of magnetic lines of force if two or more coil and capacitor bank sets are incorporated into the hand-held detector. Such an example embodiment in accordance with an aspect of the present invention with three coils 18 and a sensor array 19 is shown in FIG. 9. The three coils 18 are pulsed sequentially to produce a large range of angles of magnetic lines of force impinging upon the ferromagnetic object being scanned. In FIG. 9A superimposed force lines 13 of the three coils 18 are shown.

Figure 10:
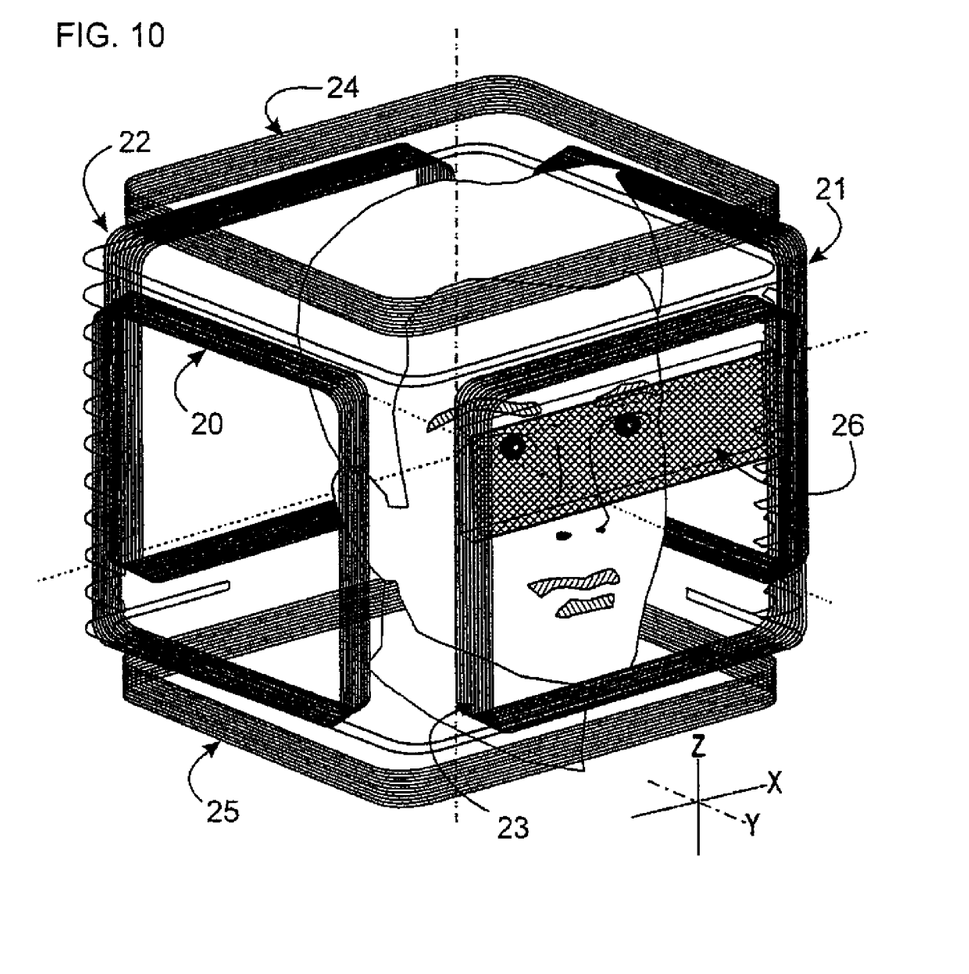
FIG. 10 is a perspective schematic view of a head mounted ferromagnetic detector

A head mounted embodiment is shown in FIG. 10 as yet another example in accordance with another aspect of the present invention. The present example may be useful to sense presence of ferromagnetic particles in the orbits of the eyes. Three orthogonal pairs of coils are shown 20 & 21, 22 & 23, 24 & 25, respectively. The sensor array 26 is shown positioned in front of the eyes. However, other locations are possible. When a signal is produced by the microprocessor, the associated capacitor bank discharges its energy into the coil pair (e.g., 20 & 21) such that the magnetic field strength from each coil of the coil pair (e.g. 20 & 21) reinforces each other in the space between the coils. Sequentially, the microprocessor triggers monopolar magnetic pulses in a similar manner for the other two coil pairs (e.g. 22 & 23, 24 & 25). The subject is then asked to move his or her eyes or is given a visual stimulus to cause eye movement. After a short pause, the sample and hold sequence of the ferromagnetic sensor array is initiated and digital data is acquired for any ferromagnetic particles in the orbits of the eyes.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed:

1. A magnetic resonance compatible apparatus configured for increasing the ability to detect ferromagnetic objects by scanning for magnetic fields produced by those ferromagnetic objects themselves and by increasing the magnetization of the objects but while not exposing the personnel associated with the ferromagnetic objects, to unsafe levels of magnetic fields, or to magnetic fields which exceed recognized safety levels, as the personnel and associated ferromagnetic objects are moved/passed through a portal the magnetic resonance apparatus including:
   at least one coil configured to generate a magnetic field positioned in the area of the object to be detected;
   an electrical energy storage capacitor bank capable of quickly releasing stored energy; a high speed, high current electronic switch capable of quickly transferring the stored energy from the capacitor bank to the coil thereby producing in the coil a short duration, single polarity magnetic field pulse;
   a sample and hold circuit capable of acquiring magnetic field sensor data during periods when the pulsed magnetic field is not present; and
   a microprocessor controller configured to control the timing and sequence of the magnetic pulse generation and the sensor data sample and hold process.

2. A magnetic resonance compatible apparatus as claimed in claim 1, wherein the at least one coil includes a pair of coils, each coil of the pair produces a magnetic field which reinforces the magnetic field of the other coil in the area between the pair of coils.

3. A magnetic resonance compatible apparatus as claimed in claim 1, wherein the at least one coil includes a plurality of coil pairs that are configured to allow the generation of a magnetic field from more than one direction.

4. A magnetic resonance compatible apparatus as claimed in claim 1, wherein the at least one coil is included in a structure defining the portal.

5. A magnetic resonance compatible apparatus as claimed in claim 4, wherein the at least one coil is separate from the structure defining the portal and is positioned in an approached path to the portal.

6. A magnetic resonance compatible apparatus as claimed in claim 1, wherein the at least one coil includes a plurality of coils, the magnetic resonance compatible apparatus includes a plurality of capacitor banks and a plurality of electronic switches, with each coil being provided with an independent capacitor bank and an independent electronic switch in order to allow each coil to produce an independently timed magnetic field pulse in the portal.

7. A magnetic resonance compatible apparatus as claimed in claim 1, wherein the at least one coil includes a plurality of coil pairs, the apparatus includes a plurality of capacitor banks and a plurality of electronic switches, with each coil pair being provided with an independent capacitor bank and an independent electronic switch in order to allow each coil pair to produce an independently timed magnetic field pulse in the portal.

8. A magnetic resonance compatible apparatus as claimed in claim 1, including a motion detector configured for triggering the magnetic pulse sequence.

9. A magnetic resonance compatible apparatus as claimed in claim 1, including a position detector configured for triggering the magnetic pulse sequence.

10. A magnetic resonance compatible apparatus as claimed in claim 1, wherein the magnetic pulse sequence is produced continuously at a preprogrammed rate.

11. A magnetic resonance compatible apparatus as claimed in claim 1, wherein the magnetic resonance compatible apparatus is configured for increasing the ability to detect ferromagnetic objects passing under a hand-held detector.

12. A magnetic resonance compatible apparatus as claimed in claim 1, wherein the magnetic resonance compatible apparatus is a head mounted magnetic resonance compatible apparatus.

13. A magnetic resonance compatible apparatus as claimed in claim 12, wherein the at least one coil includes a pair of coils configured for location on opposite sides of the head, each coil produces a magnetic field that reinforces the magnetic field of the other coil in the area between the pair of coils.

14. A magnetic resonance compatible apparatus configured for increasing the ability to detect ferromagnetic objects passing under a hand-held detector by scanning for magnetic fields produced by those ferromagnetic objects themselves and by increasing the magnetization of the ferromagnetic objects while not exposing the personnel associated with the ferromagnetic objects to unsafe levels of magnetic fields, or to magnetic fields which exceed recognized safety levels, the magnetic resonance compatible apparatus including:
   at least one coil configured to generate a magnetic field positioned in the area of the object to be detected;
   an electrical energy storage capacitor bank capable of quickly releasing stored energy;
   a high speed, high current electronic switch capable of quickly transferring the stored energy from the capacitor bank to the coil thereby producing in the coil a short duration, single polarity magnetic field pulse;
   a sample and hold circuit capable of acquiring magnetic field sensor data during periods when the pulsed magnetic field is not present; and
   a microprocessor controller configured to control the timing and sequence of the magnetic pulse generation and the sensor data sample and hold process.

15. A magnetic resonance compatible apparatus as claimed in claim 14, wherein the at least one coil includes a plurality of coils, where each coil of the plurality of coils generates a magnetic field that has lines of force at different angles than the other coils of the plurality, thereby producing a diverse magnetization lines of force pattern.

16. A head mounted magnetic resonance compatible apparatus which increases the ability to detect ferromagnetic objects by scanning for magnetic fields produced by those ferromagnetic objects themselves and by increasing the magnetization of the ferromagnetic objects while also not exposing the personnel associated with the ferromagnetic objects, to unsafe levels of magnetic fields, or to magnetic fields which exceed recognized safety levels, existing in the orbit of the eye the magnetic resonance compatible apparatus including:
   at least one coil configured to generate a magnetic field positioned in the area of the object to be detected; an electrical energy storage capacitor bank capable of quickly releasing the stored energy;
   a high speed, high current electronic switch capable of quickly transferring the stored energy from the capacitor bank to the coil thereby producing in the coil a short duration, single polarity magnetic field pulse;
   a sample and hold circuit capable of acquiring magnetic field sensor data during periods when the pulsed magnetic field is not present; and
   a microprocessor controller configured to control the timing and sequence of the magnetic pulse generation and the sensor data sample and hold process.

17. A magnetic resonance compatible apparatus as claimed in claim 16, wherein the at least one coil includes a pair of coils configured for location on opposite sides of the head, each coil produces a magnetic field that reinforces the magnetic field of the other coil in the area between the pair of coils.

18. A magnetic resonance compatible apparatus as claimed in claim 16, wherein the at least one coil includes multiple pairs of coils, for each pair of coils the coils being located on opposite sides of the head and produces a magnetic field which reinforces the magnetic field of the other coil of the pair in the area between the coils.

19. A magnetic resonance compatible apparatus as claimed in claim 18, wherein there are three pairs of coils, and each pair of coils is oriented orthogonally to the other pairs of coils.

* * * * *

UNITED STATES PATENT AND TRADEMARK OFFICE
CERTIFICATE OF CORRECTION

| | | |
|---|---|---|
| PATENT NO. | : 8,148,989 B2 | |
| APPLICATION NO. | : 12/360367 | |
| DATED | : April 3, 2012 | |
| INVENTOR(S) | : Keith Kopp | |

It is certified that error appears in the above-identified patent and that said Letters Patent is hereby corrected as shown below:

Column 9, line 41, please delete "approached" and insert --approach--.

Signed and Sealed this
Sixth Day of November, 2012

David J. Kappos
*Director of the United States Patent and Trademark Office*